(12) United States Patent
Reinprecht et al.

(10) Patent No.: US 11,801,753 B2
(45) Date of Patent: Oct. 31, 2023

(54) BATTERY SYSTEM AND VEHICLE INCLUDING THE BATTERY SYSTEM

(71) Applicant: SAMSUNG SDI CO., LTD., Yongin-si (KR)

(72) Inventors: Wolfgang Reinprecht, Attendorf (AT); Maximilian Hofer, Hartberg (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 17/654,981

(22) Filed: Mar. 15, 2022

(65) Prior Publication Data

US 2022/0297542 A1 Sep. 22, 2022

(30) Foreign Application Priority Data

Mar. 18, 2021 (EP) .................................... 21163473
Mar. 11, 2022 (KR) ....................... 10-2022-0030850

(51) Int. Cl.
*B60L 3/00* (2019.01)
*H01H 39/00* (2006.01)
*B60L 58/10* (2019.01)
*B60L 3/04* (2006.01)

(52) U.S. Cl.
CPC .............. *B60L 3/0046* (2013.01); *B60L 3/04* (2013.01); *B60L 58/10* (2019.02); *H01H 39/006* (2013.01); *B60L 2240/54* (2013.01); *H01H 2039/008* (2013.01)

(58) Field of Classification Search
CPC .......... B60L 3/0046; B60L 58/10; B60L 3/04; B60L 2240/54; H01H 39/006; H01H 2039/008
See application file for complete search history.

(56) References Cited

U.S. PATENT DOCUMENTS

2007/0216452 A1 9/2007 Matsumoto et al.
2012/0325190 A1* 12/2012 Brandes .................. F02P 15/10
                                                        123/644
2019/0359081 A1* 11/2019 Erhart ..................... B60L 1/003
(Continued)

FOREIGN PATENT DOCUMENTS

CN    111640895 A    9/2020
DE    102008044774 A1    10/2009
DE    102012215074 A1    2/2014
(Continued)

OTHER PUBLICATIONS

Extended European Search Report issued in corresponding application No. EP 21196570.0, dated Feb. 16, 2022, 7 pages.
(Continued)

*Primary Examiner* — Jared Fureman
*Assistant Examiner* — Duc M Pham
(74) *Attorney, Agent, or Firm* — Lewis Roca Rothgerber Christie LLP

(57) ABSTRACT

A battery system for an electric vehicle includes a high voltage battery including a plurality of battery cells interconnected with one another configured to provide a high voltage output at battery system terminals and a battery disconnecting element powered by the high voltage battery and configured to disconnect the high voltage battery from at least one of the battery system terminals in the event of a malfunction or crash.

12 Claims, 1 Drawing Sheet

(56) References Cited

U.S. PATENT DOCUMENTS

2019/0379220 A1* 12/2019 Ueda ................ H02J 7/007
2022/0231537 A1* 7/2022 Hirota ................ H02J 7/16

FOREIGN PATENT DOCUMENTS

| EP | 3079185 A1 | 10/2016 | |
| WO | WO 2015-082201 A1 | 6/2015 | |
| WO | WO-2015082201 A1 * | 6/2015 | ........ H01M 10/4257 |

OTHER PUBLICATIONS

Extended European Search Report issued in corresponding application No. EP 21163473.8, dated Oct. 7, 2021, 8 pages.
Audi Vorsprung durch Technik, "Leitfaden Für Rettungskräfte", Mar. 4, 2005, XP055405245, Url: https://www.audi.de/dam/nemo/models/misc/special-purpose-vehicles/PDF/IG_DE_RL_Audi_Web.pdf (retrieved from the internet Sep. 11, 2017), 40 pages.
Audi Vorsprung durch Technik, "Leitfaden Für Rettungskräfte", Sep. 2019, URL: https://www.audi.de/dam/nemo/models/misc/special-purpose-vehicles/PDF/IG_DE_RL_Audi_Web.pdf (retrieved from internet Feb. 21, 2022), 56 pages.
Audi Vorsprung durch Technik, "Guideline for Rescue Forces", Sep. 2019, URL: https://www.audi.de/dam/nemo/models/misc/special-purpose-vehicles/PDF/IG_EN_RL_Audi_Web.pdf (retrieved from internet Feb. 21, 2022) English translation, 56 pages.

* cited by examiner

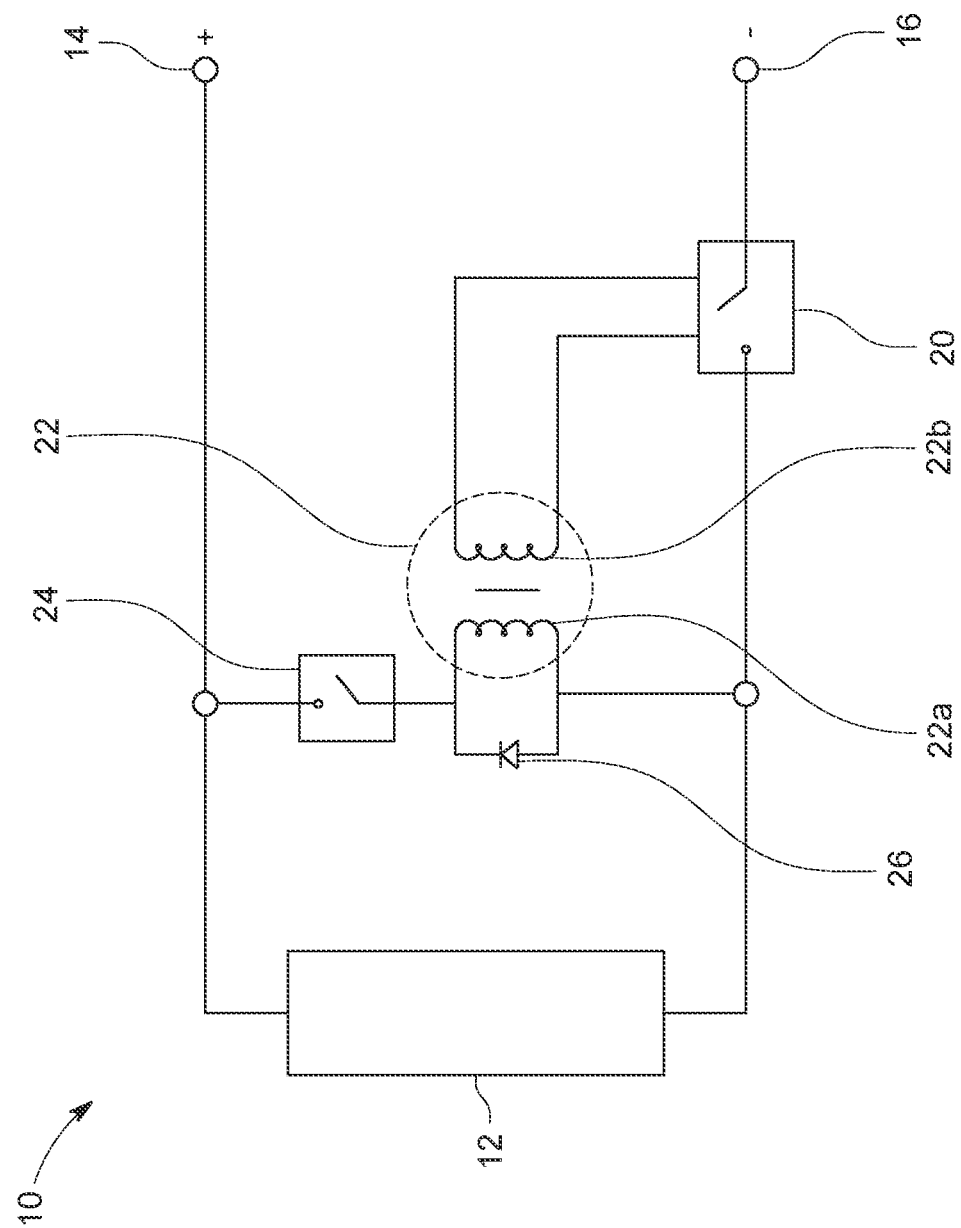

BATTERY SYSTEM AND VEHICLE INCLUDING THE BATTERY SYSTEM

CROSS-REFERENCE TO RELATED APPLICATION

This application claims priority to and the benefit of European Patent Application No. 21163473.8, filed in the European Patent Office on Mar. 18, 2021, and Korean Patent Application No. 10-2022-0030850, filed in the Korean Intellectual Property Office on Mar. 11, 2022, the entire content of both of which is incorporated herein by reference.

BACKGROUND

1. Field

Aspects of embodiments of the present disclosure relate to a battery system and a vehicle including the battery system.

2. Description of the Related Art

Recently, vehicles for transportation of goods and peoples have been developed that use electric power as a source for motion. Such an electric vehicle is an automobile that is propelled by an electric motor using energy stored in rechargeable (or secondary) batteries. An electric vehicle may be solely powered by batteries or may be a hybrid vehicle powered by, for example, a gasoline generator. Furthermore, the vehicle may include a combination of an electric motor and a conventional combustion engine.

Generally, an electric-vehicle battery (EVB, or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter provides an irreversible conversion of chemical to electrical energy. Low-capacity rechargeable batteries are used as power supply for small electronic devices, such as cellular phones, notebook computers, and camcorders, while high-capacity rechargeable batteries are used as power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, may be selected based on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled to each other in series and/or in parallel to provide a high energy density, such as for motor driving of a hybrid vehicle. For example, the battery module may be formed by interconnecting the electrode terminals of the plurality of unit battery cells in an arrangement or configuration depending on a desired amount of power and to realize a high-power rechargeable battery.

Battery modules can be constructed in either a block design or a modular design. In the block design, each battery is coupled to a common current collector structure and a common battery management system, and the unit thereof is arranged in a housing. In the modular design, pluralities of battery cells are connected to form submodules, and several submodules are connected to form the battery module. In automotive applications, battery systems often consist of a plurality of battery modules connected to each other in series to provide a desired voltage. The battery modules may include submodules with a plurality of stacked battery cells, and each stack may include cells connected in parallel that are, in turn, connected in series (XpYs) or cells connected in series that are, in turn, connected in parallel (XsYp).

A battery pack is a set of any number of (often identical) battery modules. They may be configured in a series, parallel or a mixture of both to deliver the desired voltage, capacity, or power density. Battery packs include the individual battery modules and the interconnects, which provide electrical conductivity between them.

Static control of battery power output and charging may not be sufficient to meet the dynamic power demands of various electrical consumers connected to the battery system. Thus, steady exchange of information between the battery system and the controllers of the electrical consumers may be implemented. This information includes the battery system's actual state of charge (SoC), potential electrical performance, charging ability, and internal resistance, as well as actual or predicted power demands or surpluses of the consumers. Therefore, battery systems usually include a battery management system (BMS) for obtaining and processing such information on a system level and further include a plurality of battery module managers (BMMs), which are part of the system's battery modules and obtain and process relevant information on a module level. The BMS usually measures the system voltage, the system current, the local temperature at different places inside the system housing, and the insulation resistance between live components and the system housing. And the BMMs usually measure the individual cell voltages and temperatures of the battery cells in a battery module.

Thus, the BMS/BMM is provided for managing the battery pack, such as by protecting the battery from operating outside its safe operating area (or safe operating parameters), monitoring its state, calculating secondary data, reporting that data, controlling its environment, authenticating it, and/or balancing it.

In case of an abnormal operation state, a battery pack may usually be disconnected from a load connected to a terminal of the battery pack. To this end, battery systems further include a battery disconnect unit (BDU) that is electrically connected between the battery module and battery system terminals. Thus, the BDU is the primary interface between the battery pack and the electrical system of the load, such as the vehicle. The BDU includes electromechanical switches that open or close high current paths between the battery pack and the electrical system. The BDU provides feedback to a battery control unit (BCU) accompanying the battery modules, such as voltage and current measurements. The BCU controls the switches in the BDU by using low current paths based on the feedback received from the BDU. The BDU may control current flow between the battery pack and the electrical system and sense current. The BDU may further manage external charging and pre-charging. Pyrotechnic elements are often used to disconnect the battery in case of a malfunction of the battery or in case of a crash of the electric vehicle carrying the battery.

Generally, BDUs are powered by the low voltage power supply of an electric vehicle, such as by a 12 V battery. A capacitor may be used to store energy to ensure that the power needed for disconnection, for example the power needed to trigger a pyrotechnic element, is available even in the case of an abrupt disconnection from the low voltage power supply.

BDUs that rely on a capacitor for energy storage are complex because multiple components are needed to ensure the release of the pyro element. Further, if the low voltage power supply is slowly (e.g., not abruptly) disconnected from the BDU, for example because of damage to the connecting cables, the capacitor cannot be charged and the pyro element will not operate.

SUMMARY OF DISCLOSURE

According to embodiments of the present disclosure, at least some of the drawbacks of the related art are overcome or reduced and a less complex battery system, which is able to be disconnected securely and reliably from the electrical system of the vehicle in case of a malfunction or crash is provided.

According to an embodiment of the present disclosure, the battery system for an electric vehicle includes: a high voltage battery with a plurality of battery cells interconnected with one another to provide a high voltage output at battery system terminals of the battery system; and a battery disconnecting element for disconnecting the high voltage battery from at least one of the battery system terminals in the event of a malfunction or crash. The battery disconnecting element is powered by the high voltage battery.

The high voltage battery may be a traction battery of an electric vehicle (e.g., it may power the propulsion of a battery electric vehicle). The high voltage battery is adapted to be connected to the electrical system of the vehicle via the battery system terminals and may provide one or more voltages in the high voltage (HV) range starting at about 60 V, such as between about 60 V and about 1,500 V. For example, the high voltage battery may provide a voltage of about 400 V and/or a current of about 20 mA. The high voltage battery may form part of a HV supply circuit of an electric vehicle that provides power for the electric propulsion of the electric vehicle. An electric vehicle may include further supply circuits, such as a low voltage (LV) supply circuit powered by a low voltage power supply of the electric vehicle, such as a 12 V car battery, as mentioned above. The LV supply circuit usually powers functions other than the propulsion of the electric vehicle, for example, comfort functions.

The battery disconnecting element, according to embodiments of the present disclosure, is configured to disconnect the high voltage battery from at least one of the battery system terminals in the event of a malfunction of the battery or in the event of a crash of the electric vehicle including the high voltage battery as a traction battery. An overcurrent occurring in the battery may be interpreted as a malfunction of the battery, and an overcurrent sensor may be provided to detect such an overcurrent. A crash of the vehicle may be detected by a crash sensor of the vehicle. The battery disconnecting element is electrically connected with the high voltage battery and with one or both of the battery system terminals. For example, the battery disconnecting element is electrically connected between the high voltage battery and the battery system terminals and may be considered to be part of a battery disconnect unit (BDU) as mentioned above. By disconnecting the high voltage battery from at least one of the battery system terminals, the high voltage battery is disconnected from the electrical system of the vehicle including from the above-mentioned HV supply circuit.

According to embodiments of the present disclosure, the battery disconnecting element is powered by the high voltage battery (e.g., the traction battery of the electric vehicle). The battery disconnecting element being powered by the high voltage battery means that the energy needed to trigger the battery disconnecting element is provided by the high voltage battery. For example, the battery disconnecting element may include a pyro element, and the energy needed to trigger the pyro fuse is taken from the high voltage battery. When the battery disconnecting element is powered/triggered, the high voltage battery is separated from at least one of the battery system terminals and, therefore, from the electrical system of the vehicle.

Thus, the high voltage traction battery of the electric vehicle is used to power/trigger the battery disconnecting element, such as a pyro element. For example, the energy needed to trigger the battery disconnecting element, such as the pyro element, is taken from the high voltage battery, which is intended to be electrically disconnected from the drive system in the event of a malfunction or crash. Thus, the high voltage traction battery disconnects itself from the electrical system (e.g., from the HV supply circuit) of the vehicle in the event of a malfunction or crash. As long as the high voltage battery supply is available, enough power can be provided to trigger the battery disconnecting element. Thus, the energy for disconnection of the battery system from the electrical system of the vehicle is available at all times and does need not to be stored in capacitors.

Compared to related art designs, embodiments of the present disclosure do not use the LV power supply of the electric vehicle to power/trigger the battery disconnecting element but rather use the HV power supply (e.g., the traction battery), which is supposed to be disconnected via the battery disconnecting element. The battery system according to embodiments of the present disclosure is therefore less complex while still able to be disconnected securely and reliably from the electrical system of the vehicle in the event of a malfunction or crash. Further, because the battery system id less complex than related art designs, there is a lower risk of malfunction of the BDU.

According to an embodiment, the battery disconnecting element includes a pyro element, such as a pyro fuse. Triggering the pyro element leads to the disconnection of the high voltage battery from at least one of the battery terminals and, thus, from the electrical system of the vehicle. A pyro element allows for a particularly reliable disconnection.

According to an embodiment, the battery system further includes a transformer adapted to transform the high voltage of the high voltage battery to a voltage suitable for powering the battery disconnecting element and/or a current of the high voltage battery to a current suitable for powering the battery disconnecting element. Thus, with the transformer, the voltage and/or current output of the high voltage battery may be adapted to levels suitable for powering/triggering the battery disconnecting element. Thus, when the battery disconnecting element includes a pyro element, the transformer may be adapted to transform the high voltage and/or the current of the high voltage battery to a voltage and/or current suitable for triggering the pyro element. For example, the transformer may be adapted to transform the 400 V/20 mA output of the high voltage battery to 4 V/2 A for input to the battery disconnecting element. The transformer may also be part of the BDU of the battery system.

According to an embodiment, the battery disconnecting element includes a switch and a control unit adapted to actuate the switch. Actuating the switch powers the battery disconnecting element. For example, actuating the switch may connect the battery disconnecting element to the high voltage battery, thereby powering/triggering the battery disconnecting element. Actuating the switch may include closing the switch and, thereby, a driver circuit including the high voltage battery and the battery disconnecting element so that via the switch the disconnecting element may be triggered. The switch is actuated by the control unit. The control unit may be configured to actuate the switch when a malfunction of the battery occurs and/or when a crash occurs. Respective sensors may be provided to detect such a malfunction or crash, and depending on (or according to) the sensor output the control unit may actuate the switch. The control unit may be powered by, for example, a low voltage supply, such as a 12 V car battery, via the above-mentioned low voltage supply circuit. Thus, the control unit may be part of the low voltage supply circuit. The switch and/or the control unit for the switch may be part of the BDU of the battery system.

According to another embodiment, the battery system includes a backup power supply for the control unit in the event that a main power supply of the control unit fails. As mentioned, the main power supply of the control unit may be the low voltage supply of the electric vehicle, such as the 12 V car battery. If this main power supply fails, for example, because the 12 V car battery is disconnected from the control unit and/or the BDU, the backup power supply comes in. Thus, the battery disconnecting element is ensured to be triggered.

According to another an embodiment, the control unit is adapted to actuate the switch for a time span (e.g., a predetermined time span), such as for a few milliseconds. For example, the control unit may be adapted to close the switch, thereby connecting the battery disconnecting element to the high voltage battery and to open the switch again after a time span. The time span may be determined (or chosen) so that the battery disconnecting element is powered sufficiently long to be triggered.

Actuating the switch only for a limited time increases system safety.

According to an embodiment, the transformer includes a first coil and a second coil. The first coil and the switch are connected in series to each other and both of them are connected in parallel to the high voltage battery between the two battery system terminals. The second coil is connected to the battery disconnecting element to trigger the battery disconnecting element. This arrangement allows for a simple BDU design.

According to another embodiment, the battery system may include a diode connected in parallel to the first coil of the transformer. The diode may be, for example, a flyback diode. The diode may protect the switch. For example, the diode may be used to eliminate flyback (e.g., a sudden voltage spike seen across the transformer as an inductive load when its supply current is suddenly reduced or interrupted).

According to another embodiment of the present disclosure, an electric vehicle including a battery system according to an embodiment. The electric vehicle may be a fully electric vehicle or a hybrid vehicle as explained above. The high voltage battery of the battery system acts as the traction battery of the electric vehicle. The electric vehicle may include a low voltage supply circuit powered by a low voltage power supply of the electric vehicle and a high voltage supply circuit powered by the high voltage power supply of the battery system as has also been explained above. Further, the low voltage power supply may be configured to power the control unit that is configured to actuate the switch to power the battery disconnecting element as has been explained above.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, exemplary embodiments with reference to the attached drawing, which is a block diagram illustrating a battery system according to an embodiment of the present disclosure.

DETAILED DESCRIPTION

Reference will now be made, in detail, to embodiments, an example of which are illustrated in the accompanying drawing. Aspects and features of the embodiments, and implementation methods thereof, will be described with reference to the accompanying drawing. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

Throughout the specification, like reference numerals denote like elements, and redundant descriptions may be omitted. For better readability, not all elements in the FIGURE may be marked with reference signs, especially in the case of redundant elements. Accordingly, processes, elements, and techniques that are not considered necessary for those having ordinary skill in the art to have a complete understanding of the aspects and features of the present disclosure may not be described. In the drawing, the relative sizes of elements, layers, and regions may be exaggerated for clarity.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure.

It will be further understood that the terms "have," "include," "comprise," "having," "including," or "comprising" specify a property, a region, a fixed number, a step, a process, an element, a component, and a combination thereof but do not exclude other properties, regions, fixed numbers, steps, processes, elements, components, and combinations thereof.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. Further, the various components of these devices may be implemented on a flexible printed circuit film, a tape carrier package (TCP), a printed circuit board (PCB), or formed on one substrate. The electrical connections or interconnections described herein may be realized by wires or conducting elements, for example, on a PCB or another kind of circuit carrier. The conducting elements may include metallization, such as surface metallizations and/or pins, and/or conductive polymers or ceramics. Further, electrical energy may be transmitted via wireless connections, for example, by using electromagnetic radiation and/or light.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification and should not be interpreted in an idealized or overly formal sense, unless expressly so defined herein.

A battery system 10 for an electric vehicle according to an embodiment of the present disclosure is shown in the FIGURE. The battery system 10 includes a high voltage battery 12, which in turn includes a plurality of battery cells. The battery cells may be arranged in a row forming one or more battery modules. Each battery cell may include two electrode terminals, which are connected with electrodes of the respective battery cell. The battery cells may be interconnected with one another via busbars providing an electrical connection between the electrode terminals of two neighboring battery cells. For example, the battery cells may be interconnected with one another in series via the busbars within the modules. The high voltage battery 12 is connected with two battery system terminals 14, 16 through which the high voltage battery 12 may provide its high voltage output to, for example, an electric vehicle.

The battery system 10 further includes a pyro fuse 20 as a battery disconnecting element for disconnecting the high voltage battery 12 from at least one of the battery system terminals 14, 16 in the event of a malfunction or crash. The pyro fuse 20 may sever the connection between the battery system terminal 16 and the high voltage battery 12. The pyro fuse 20 is powered by the high voltage battery 12 as will be explained below.

The battery system 10 further includes a transformer 22 and a switch 24. The transformer 22 includes a first coil 22a and a second coil 22b. The first coil 22a and the switch 24 are connected to each other in series, and the first coil 22a and the switch 24 are connected, in parallel, to the high voltage battery 12 between the two battery system terminals 14, 16 as shown in, for example, the FIGURE. The second coil 22b is connected to the pyro fuse 20.

The high voltage battery 12, the transformer 22, and the switch 24 form a driver circuit for supplying the pyro fuse 20 with power to trigger the pyro fuse 20. The pyro fuse 20, the transformer 22, and the switch 24 may be part of a battery disconnecting unit (BDU).

In the event of a malfunction of the battery system or a crash of the electric vehicle including the high voltage battery as a traction battery, a control unit actuates (e.g., closes) the switch 24 and triggers the pyro fuse 20. The switch 24 may be actuated by the control unit when the control unit receives either a crash signal provided by the vehicle system or by a signal output of an overcurrent monitoring system of the battery. The driver circuit is closed by actuating the switch 24 to connect the pyro fuse 20 with the high voltage battery 12 as a power supply so that the pyro fuse 20 is triggered. The transformer is galvanically isolated (e.g., has a galvanic isolation) and provides power (e.g., the correct power) sufficient to trigger the pyro fuse 20 (e.g., the transformer transforms the low current, high voltage pulse provided by the high voltage battery 12 via its coils 22a, 22b into a low voltage, high current pulse that is applied to the pyro fuse 20 to fire the fuse).

Furthermore, the driver circuit includes a flyback diode 26 connected in parallel to the first coil 22a of the transformer 22. The flyback diode 26 protects the switch 24 from flyback (e.g., a sudden voltage spike seen across the transformer 22 when its supply current is suddenly reduced or interrupted). The flyback diode 26 may also be part of the BDU.

Thus, the battery system of the high voltage battery, such as the traction battery of the electric vehicle, is itself used to power the battery disconnecting element (e.g., to trigger the pyro fuse). Therefore, no capacitor is needed to provide power to the battery disconnecting element. The battery system according to the present disclosure is therefore less complex and has a lower risk of malfunctioning.

REFERENCE SIGNS 10 battery system
12 high voltage battery
14, 16 battery system terminals
20 pyro fuse
22 transformer
22a first coil of transformer
22b second coil of transformer
24 switch
26 flyback diode

What is claimed is:

1. A battery system for an electric vehicle, the battery system comprising:
   a high voltage battery comprising a plurality of battery cells interconnected with one another and configured to provide a high voltage output at battery system terminals; and
   a battery disconnecting element powered by the high voltage battery and configured to disconnect the high voltage battery from at least one of the battery system terminals in the event of a malfunction or crash,
   wherein the battery disconnecting element comprises a pyro element and energy needed to trigger the pyro element is provided by the high voltage battery.

2. The battery system of claim 1, further comprising a transformer configured to transform at least one of the high voltage output of the high voltage battery to a voltage for powering the battery disconnecting element and a current of the high voltage battery to a current for powering the battery disconnecting element.

3. The battery system of claim 2, wherein the battery disconnecting element further comprises a switch and a control unit configured to actuate the switch, and wherein actuating the switch powers the battery disconnecting element.

4. The battery system of claim 3, wherein the control unit is configured to actuate the switch for a time span.

5. The battery system of claim 3, further comprising a backup power supply for the control unit.

6. The battery system of claim 3, wherein the transformer comprises a first coil and a second coil, the first coil and the switch are connected in series to each other and connected in parallel to the high voltage battery between the battery system terminals, the second coil being connected to the battery disconnecting element to trigger the battery disconnecting element.

7. The battery system of claim 6, further comprising a diode connected in parallel to the first coil of the transformer.

8. The battery system of claim 7, wherein the diode is a flyback diode.

9. An electric vehicle comprising the battery system of claim 1.

10. The electric vehicle of claim 9, further comprising a low voltage supply circuit powered by a low voltage power supply and a high voltage supply circuit powered by the high voltage battery.

11. The electric vehicle of claim 10, wherein the battery disconnecting element comprises a switch and a control unit configured to actuate the switch, and
    wherein actuating the switch powers the battery disconnecting element.

12. The electric vehicle of claim 11, wherein the low voltage power supply is configured to power the control unit.

* * * * *